(12) United States Patent
Chen et al.

(10) Patent No.: US 7,996,894 B1
(45) Date of Patent: Aug. 9, 2011

(54) MAC ADDRESS MODIFICATION OF OTHERWISE LOCALLY BRIDGED CLIENT DEVICES TO PROVIDE SECURITY

(75) Inventors: Zhong Chen, Fremont, CA (US); Joseph H. Levy, Eagle Mountain, UT (US); David M. Telehowski, San Jose, CA (US); Jin Shang, Newark, CA (US)

(73) Assignee: Sonicwall, Inc., San Jose, CA (US)

( * ) Notice: Subject to any disclaimer, the term of this patent is extended or adjusted under 35 U.S.C. 154(b) by 867 days.

(21) Appl. No.: 11/058,828

(22) Filed: Feb. 15, 2005

(51) Int. Cl.
*G06F 11/00* (2006.01)
*G06F 15/16* (2006.01)

(52) U.S. Cl. ............. 726/22; 726/2; 726/3; 726/11; 726/12; 726/14; 726/23; 709/223; 709/225; 709/239; 709/244; 370/389; 370/392

(58) Field of Classification Search ............ 726/2, 3, 726/11, 12, 14, 22, 23; 709/223, 225, 239, 709/244; 370/389, 392
See application file for complete search history.

(56) References Cited

U.S. PATENT DOCUMENTS

| | | | |
|---|---|---|---|
| 5,623,601 A | 4/1997 | Vu | |
| 5,757,924 A | 5/1998 | Friedman et al. | |
| 5,790,554 A * | 8/1998 | Pitcher et al. | 370/471 |
| 6,023,563 A * | 2/2000 | Shani | 709/249 |
| 6,700,891 B1 * | 3/2004 | Wong | 370/401 |
| 6,728,232 B2 | 4/2004 | Hasty, Jr. et al. | |
| 6,829,651 B1 | 12/2004 | Bass et al. | |
| 6,832,262 B2 | 12/2004 | Cromer et al. | |
| 7,072,933 B1 * | 7/2006 | Lamb et al. | 709/203 |
| 7,085,827 B2 * | 8/2006 | Ishizaki et al. | 709/223 |
| 7,124,197 B2 * | 10/2006 | Ocepek et al. | 709/232 |
| 7,194,554 B1 * | 3/2007 | Short et al. | 709/246 |
| 7,197,035 B2 * | 3/2007 | Asano | 370/392 |
| 7,225,270 B2 * | 5/2007 | Barr et al. | 709/238 |
| 7,382,778 B2 * | 6/2008 | Chari et al. | 370/392 |
| 7,490,351 B1 * | 2/2009 | Caves et al. | 726/13 |
| 7,533,415 B2 * | 5/2009 | Chen et al. | 726/24 |
| 7,539,192 B2 * | 5/2009 | Jeong et al. | 370/392 |
| 7,725,934 B2 * | 5/2010 | Kumar et al. | 726/22 |
| 2002/0009090 A1 * | 1/2002 | Kalkunte et al. | 370/401 |
| 2002/0107961 A1 * | 8/2002 | Kinoshita | 709/225 |
| 2003/0087629 A1 * | 5/2003 | Juitt et al. | 455/411 |
| 2003/0177125 A1 * | 9/2003 | Loukianov | 707/10 |
| 2003/0177350 A1 * | 9/2003 | Lee | 713/155 |

(Continued)

OTHER PUBLICATIONS

Internet Protocols, Chapter 30 from Internetworking Technology Overview, Jun. 1999, pp. 30-1 to 30-16.

(Continued)

*Primary Examiner* — William Korzuch
*Assistant Examiner* — Sarah Su
(74) *Attorney, Agent, or Firm* — Blakely, Sokoloff, Taylor & Zafman, LLP

(57) ABSTRACT

A method is disclosed for providing security to a client-to-client communication. The method includes authenticating a first client and a second client with an access point device, transmitting the packet to the security device and modifying a destination media access control (MAC) address of a packet from the first client to a MAC address of a security device for a first network. The packet contains a destination internet protocol (IP) address of the second client. The access point device and the first and second clients belong to the first network. The security device is located between the first network and a second network.

27 Claims, 10 Drawing Sheets

U.S. PATENT DOCUMENTS

| | | | |
|---|---|---|---|
| 2004/0052216 A1* | 3/2004 | Roh | 370/252 |
| 2004/0076300 A1* | 4/2004 | Ishidoshiro | 380/277 |
| 2004/0093513 A1* | 5/2004 | Cantrell et al. | 713/201 |
| 2004/0160903 A1* | 8/2004 | Gai et al. | 370/254 |
| 2004/0213237 A1* | 10/2004 | Yasue et al. | 370/392 |
| 2005/0108407 A1* | 5/2005 | Johnson et al. | 709/228 |
| 2005/0157690 A1* | 7/2005 | Frank et al. | 370/338 |
| 2005/0169282 A1* | 8/2005 | Wittman | 370/401 |
| 2005/0238005 A1* | 10/2005 | Chen et al. | 370/389 |
| 2005/0271065 A1* | 12/2005 | Gallatin et al. | 370/401 |
| 2006/0095968 A1* | 5/2006 | Portolani et al. | 726/23 |
| 2006/0268866 A1* | 11/2006 | Lok | 370/389 |
| 2006/0288418 A1* | 12/2006 | Yang et al. | 726/24 |

OTHER PUBLICATIONS

Jeff Edgett et al., "Generic Internace Specification White Paper", Copyright 2003, pp. 9 total.

B. Anton et al., "Best Current Practices for Wireless Internet Service Provider (WISP) Roaming", Wi-Fi Alliance, Wireless ISP Roaming, Feb. 2003, Version 1.0, pp. 1-37.

* cited by examiner

FIGURE 10

MAC ADDRESS MODIFICATION OF OTHERWISE LOCALLY BRIDGED CLIENT DEVICES TO PROVIDE SECURITY

FIELD OF THE DISCLOSURE

The present disclosure relates to shared devices, and more particularly, to MAC address modification and management of otherwise locally bridged client devices.

BACKGROUND

A network security device may provide security functions and wireless access point capability to a local area network (e.g., currently limited to about 500 meters though in the future may be longer). The network security device may also connect the local area network to a wide area network (e.g., an Internet). As technology enables the security functions of the network security device to improve, and as wireless devices become more popular, there is a trend of separating the security functions and the wireless access point capability of the network security device into separate hardware devices (e.g., so that costs can be reduced by pooling security functions of the network security device and enabling wireless Internet access to larger geographic areas by having multiple access point devices connected to a single network security device).

Today, the network security device may offer advanced functions to client devices of the local area network such as stateful packet inspection firewall (e.g., rule checking for inbound and/or outbound access), intrusion prevention (e.g., to protect against malicious traffic), content filtering (e.g., to enforce protection and productivity policies and to block inappropriate content), network antivirus enforcement (e.g., auto-enforcement of anti-virus policy for always-on virus protection), network access translation, and/or virtual private networking. It is important that these advanced functions (e.g., and/or future advanced functions) be available in networks having separate hardware devices for security functions (e.g., the single network security device) and wireless access point capability (e.g., the shared wired or wireless access point capability (e.g., the network hubs or switches or wireless access point devices).

When multiple client devices are associated with a shared access point device, and when the multiple client devices communicate with each other (e.g., transfer files between each other, instant message each other, etc.), rather than communicate with other devices/services on the Internet, the shared access point device creates a "local bridge" (e.g., the local bridge may be a direct logical connection between multiple client devices associated with the same access point device). This prevents data from traveling up through the network and may prevent at least some latency during a communication session between multiple client devices associated with the shared access point device.

However, data is not filtered through the network security device when the network security device is a separate hardware device between the shared access point device and the wide area network. Similarly, when multiple client devices associated with different access point devices are connected to the network security device through an intermediary device (e.g., a switch), the network administrator cannot apply security policies when the multiple client devices communicate with each other, because the intermediary device will also create the local bridge and prevent packets from reaching the network security device. Consequently, security policies cannot be effectively applied to communications between certain client devices when separate hardware devices are used for security and wired or wireless access point capability (e.g., because the local bridge prevents packets from reaching the network security appliance).

SUMMARY

Media access control (MAC) address modification and management of otherwise locally bridged client devices to provide security is disclosed. In one aspect, a method of an access point device includes authenticating a first client and a second client with the access point device, modifying a media access control (MAC) address of a packet of the first client having a destination internet protocol (IP) address of the second client to a security device MAC address, and transmitting the packet to the security device. The first client may be a wireless device and the second client may be a wired device. The modifying may be performed when the first client is connected to the second client through an external switch between the access point device and the security device.

The security device may perform security operations on the packet including an deep packet inspection operation, a firewall policy operation, and a content filtering operation. An address resolution table of the security device may determine a destination MAC address based on a reference of a destination internet protocol (IP) address of the packet to the destination MAC address. The address resolution table may be updated with a first MAC address of the first client based on an address resolution protocol request, and updated with the destination MAC address of the second client based on an address resolution protocol response.

In another aspect, a method of a security device includes performing at least one security operation on a first packet having a modified media access control (MAC) address, and determining a destination MAC address based on a reference of a destination internet protocol (IP) address of the first packet to the destination MAC address using an address resolution table. The method includes updating the address resolution table with media access control (MAC) addresses of both address resolution protocol requests and address resolution protocol responses to ensure that the address resolution table is accurate. The security device may receive the packet from any one of an access point device, a switch, and/or a client. The access point device, the switch, and the client may or may not perform any security operations on the first packet. The access point device, the switch, and the client may create the first packet having the modified MAC address when clients associated with the access point device, the switch, and/or the client intercommunicate.

In another aspect, a method of a shared device includes processing data from a client connected to the shared device, and routing the data through a security device when the data includes information indicating that the data has a destination of another client connected through an unprotected local bridge. The unprotected local bridge may be formed within a switch external to the shared device. The client and the another client may be authenticated through different access point devices. The shared device may modify at least one media access control (MAC) address of the data to the security device.

In another aspect, an access point device includes a processing logic circuit, a random access memory and at least one storage device connected to the processing logic circuit, and a media access control (MAC) assertion module connected to the processing logic circuit to modify a destination media access control (MAC) address of a packet having a destination interne protocol (IP) address of an otherwise locally bridged client to a security device MAC address, and to transmit the packet to the security device. The otherwise locally bridged client may be authenticated with a different access point device than the access point device.

In another aspect, a security device includes a processing logic circuit, and an address resolution coherency module connected to the processing logic circuit through a bus. The address resolution coherency module may update an address resolution table with media access control (MAC) addresses of both address resolution protocol requests and address resolution protocol responses. The address resolution protocol requests may be generated by a client associated with a first access device, and the address resolution protocol responses may be generated by a second client associated with a switch.

In another aspect, a system of managing inter-client communication includes a wide area network, a security device coupled with a wide area network, a switch coupled with the security device, and an access point device coupled with the switch to modify a media access control (MAC) address of a packet of a first client of the access point device having a destination internet protocol (IP) address of any other client associated through the switch, wherein the modification is to a MAC address of the security device. The other client may be associated through the switch through another access point device. Other features of various embodiments will be apparent from the accompanying drawings and from the detailed description that follows.

BRIEF DESCRIPTION OF THE DRAWINGS

Various embodiments are illustrated by way of example and are not limited by the figures of the accompanying drawings, in which like references indicate similar elements and in which:

FIG. 3 may also represent an exploded view or a wired access point device (such as a switch) having a Media Access Control (MAC) assertion module, according to another embodiment.

FIG. 10 is a table view of the master ARP table of FIG. 4, according to one embodiment.

DETAILED DESCRIPTION

Methods and apparatuses enabling media access control (MAC) address modification of locally bridged client devices to provide security functions is described. In the following description, numerous specific details are set forth. However, it is understood that embodiments may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment is included in at least one embodiment. The appearances of the phrase "according to one embodiment", "may", and "can" in various places in the specification do not necessarily all refer to the same embodiment.

Figure 1:
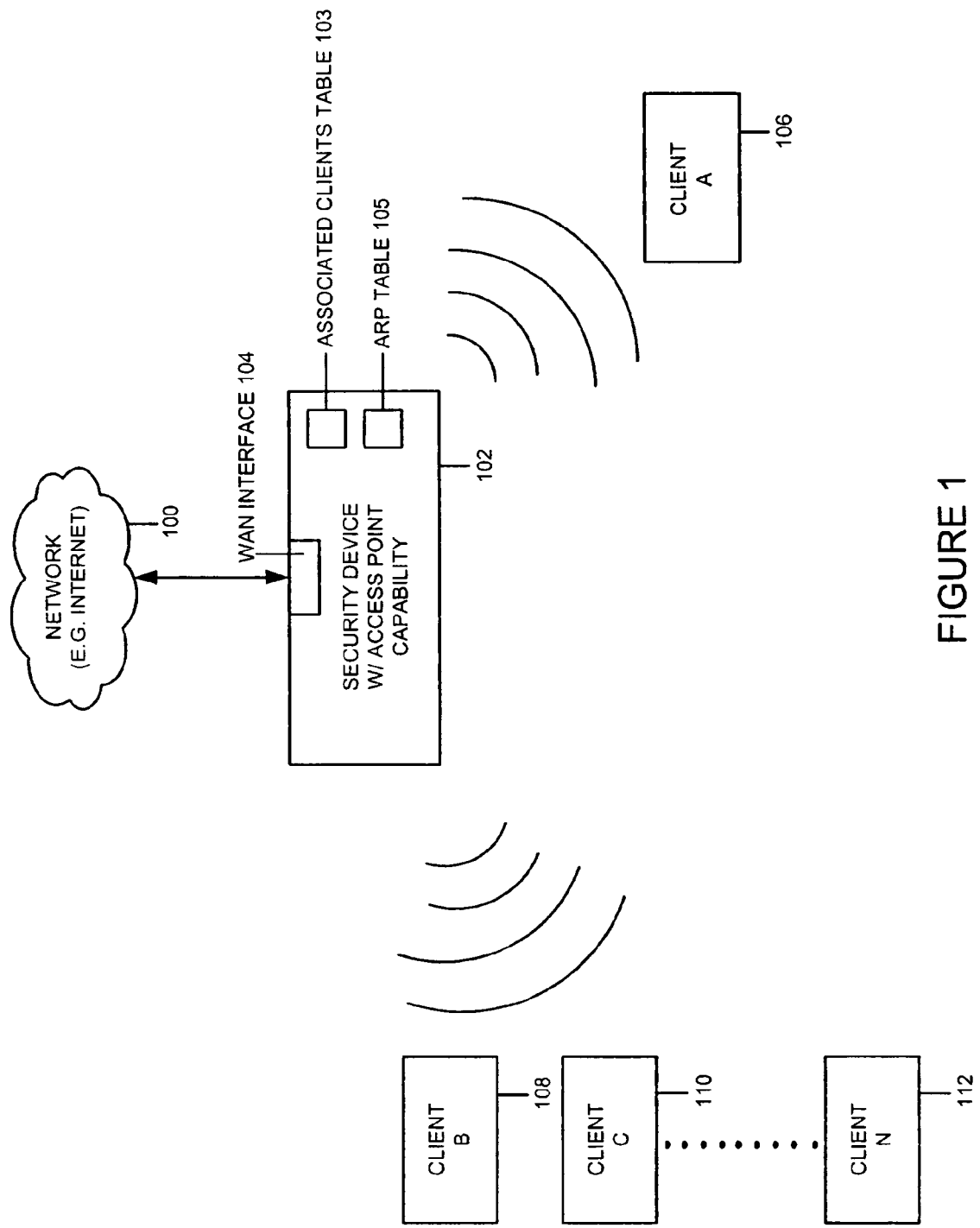
FIG. 1 is a block diagram of a security device having integrated access point capability communicating wirelessly with a number of client devices, according to one embodiment.

FIG. 1 is a block diagram of a security device having integrated access point capability 102 (hereinafter "the integrated device 102") communicating wirelessly with a number of client devices (e.g., a client device 106, a client device 108, a client device 110, a client device 112, and other client devices), according to one embodiment. The integrated device 102 is connected to a network 100 (e.g., Internet) through a wide area network (WAN) interface 104. The integrated device 102 provides security functions and wireless access point capability to the client devices.

The integrated device 102 may provide security functions such as stateful packet inspection firewall (e.g., rule checking for inbound and/or outbound access), intrusion prevention (e.g., to protect against malicious traffic), content filtering (e.g., to enforce protection and productivity policies and to block inappropriate content), network antivirus enforcement (e.g., auto-enforcement of anti-virus policy for always-on virus protection), network access translation, virtual private networking, etc. In addition, the integrated device 102 allows client devices to communicate with the network 100 (e.g., the client device 110 may communicate with a website hosted on the network 100 through the integrated device 102). Furthermore, client devices may communicate wirelessly with each other (e.g., the client device 106 and the client device 108 may transfer files and/or have an instant messaging chat with each other).

In one example, the client device 106 (e.g., a wireless enabled laptop) and the client device 108 (e.g., a wireless enabled internet appliance) may both associate with the integrated device 102 (e.g., through an authentication, authorization, and/or accounting process, etc). The integrated device 102 may update an associated client devices table 103 that identifies all client devices associated with the integrated device 102 by layer 3 IP address. By updating the associated client devices table 103, the integrated device 102 can later make a "local bridge" between associated client devices communicating with each other, so that data from a first associated client (e.g., the client device 106) does not need to travel through the network 100 to reach its destination of a second associated client (e.g., the client device 108).

Next, the client device 106 may transmit an address resolution protocol (ARP) broadcast message (e.g., a message used to request a client device's layer 2 MAC address from its layer 3 Internet address) to all client devices associated with the integrated device 102. The ARP broadcast message may include a destination IP address of the client device 108 and a media access control (MAC) address (e.g., a physical address uniquely identifying the hardware associated with the client device 106) of the client device 106. The integrated device 102 may update an ARP table 105 (e.g., internal and/or external to the integrated device 102) with the MAC address of the client device 106 based on the ARP broadcast message (e.g., the integrated device 102 may store data of the ARP table 105 in an internal cache), so that it is able to quickly lookup the MAC address of the client device 106 whenever it receives packets having a layer 3 IP destination addresses of the client device 106.

When the client device 108 receives the ARP broadcast message sent by the client device 106, it will determine that its IP address matches the IP address in the ARP broadcast message, and transmit an unicast ARP response to the client device 106 (e.g., the unicast ARP response intended for one receiver) with a MAC address of the client device 108. According to one embodiment, the integrated device 102 may include a master ARP table 402 as later will be described in detail in FIG. 4 that is updated with the MAC address of the client device 108 based on the unicast ARP response). The master ARP table 402 differs from the ARP table 105 in that the master ARP table 402 captures the MAC addresses from both the ARP broadcast message and the unicast ARP response.

Next, the client device 106 may transmit a packet (e.g., or series of packets) having a destination IP address (e.g., a layer 3 destination Internet Protocol address) associated with (e.g., connected to the broadcast domain of) the client device 108 to the integrated device 102. The integrated device 102 may perform any number of the security functions described above (e.g., content filtering, intrusion prevention, antivirus scanning, etc.) to the packet transmitted by the client device 106 having the destination IP address of the client device 108 (e.g., a network administrator may determine what security functions are applied to packets communicated through the integrated device 102).

Once the security functions are performed, the integrated device 102 will form a "local bridge" between associated client devices communicating with each other (e.g., by determining that both client devices 106 and 108 are associated with the integrated device 102 by finding entries for both client devices within the associated client devices table 103), so that data from a first associated client (e.g., the client device 106) does not need to travel through the network 100 to reach its destination of a second associated client (e.g., the client device 108). The integrated device 102 may then forward the packet to the client device 108 through the local bridge based on the MAC address of the packet (e.g., as determined by the client device 106 based on the ARP broadcast message). The integrated device 102 may use an antenna connected to one or more wireless local area network (WLAN) ports (not shown) of the integrated device 102 to forward the packet to the client device 108.

When the client device 108 transmits a response packet (e.g. or series of response packets) having a destination IP address of the client device 106, the process may operate in reverse (e.g., security functions may be applied, the ARP table 105 may be referenced, and the response packet may be transmitted to the client device 106).

Figure 2:
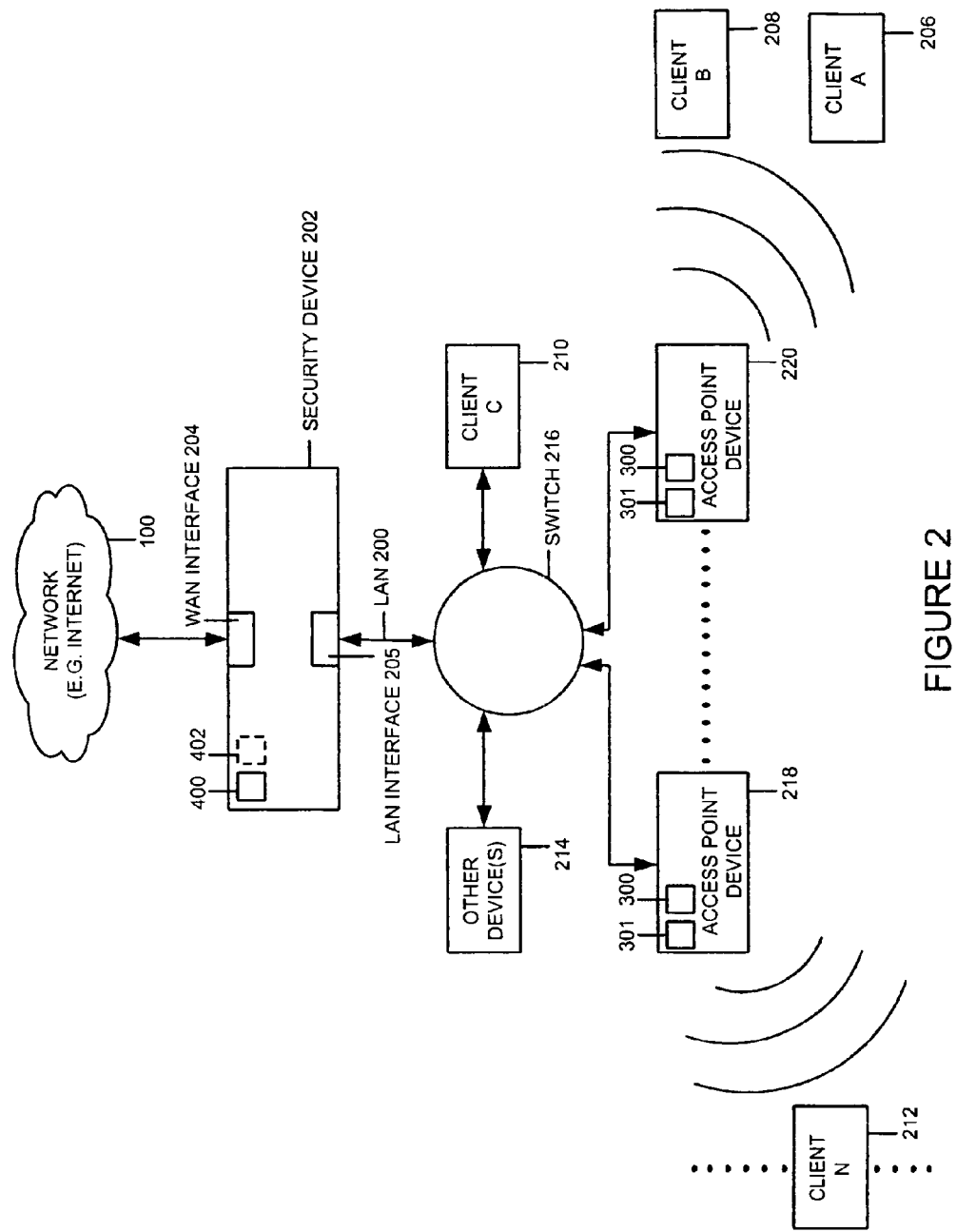
FIG. 2 is a block diagram of a security device, a switch, and a number of access point devices communicating wirelessly and/or in wired form with a number of client devices, according to one embodiment.

FIG. 2 is a block diagram of a security device 202, a switch 216, and a number of access point devices (e.g., including an access point device 218 and an access point device 220) communicating wirelessly and/or in wired form with a number of client devices (e.g., including a client device 206, a client device 208, a client device 210, a client device 212) and other device(s) 214 (e.g., a network printer, a network scanner, a network camera, a network appliance, etc.), according to one embodiment. The security device 202 is connected to the network 100 (e.g., Internet) through a wide area network (WAN) interface 204. The security device is connected to the switch 216, the access point devices, and the clients through the LAN 200.

FIG. 2 differs from the embodiment shown in FIG. 1 in that the security functions and wireless access point capability (e.g., wireless connectivity) are separated into different hardware devices in FIG. 2. The security device 202 performs the security functions whereas the access point devices (e.g., the access point device 218 and the access point device 220) offer wireless access point capability to the client devices of FIG. 2. It will be understood that the access point devices could also be wired access point devices, such as network switches, offering wired connectivity to client devices.

By separating the security functions from the access point capability, the embodiment illustrated in FIG. 2 may offer network access to a wider geographic area (e.g., because multiple access point devices may be spread across a geographic area). Furthermore, costs of providing security functions to client devices may be lower in the embodiment of FIG. 2 because the security functions may be shared across any number of access point devices and switches (e.g., the switch 216) connected to the security device 202.

The client devices of FIG. 2 may communicate with the network 100 and/or with each other. When the client devices of FIG. 2 communicate with the network 100, all data traverses the security device 202 because the security device 202 operates between the local area network (LAN) 200 (e.g., formed by the switch 216 and the access point devices) and the wide area network (e.g., the network 100). Therefore, security functions (e.g., firewall protection, intrusion detection, anti-virus monitoring, etc.) may be applied to every packet between the LAN 200 and the network 100.

When the client devices of FIG. 2 communicate with each other, in order to process data through the security device 202, MAC address modification and management is performed by the access point devices and the security device 202 (as will be described in detail in FIGS. 3-10). Without MAC address modification and management, packets transmitted between the client devices on the LAN 200 would otherwise be routed through "local bridges" formed by either the access point devices and/or the switch 216. As defined previously, a local bridge may be a direct logical connection between multiple client devices associated with a shared device (e.g., the shared device may be the access point device 218 and/or the access point device 220 and/or the switch 216). When the local bridge is formed, packets do not travel up through the network. This problem can be prevented by MAC address modification and management as will be described below.

For example, the client device 206 (e.g., a wireless enabled laptop) and the client device 208 (e.g., a wireless enabled internet appliance) may both associate with the access point device 220. The access point device 220 may update an associated client devices table 304 (as illustrated in the exploded view of the access point device 220 in FIG. 3) that identifies all client devices associated with the access point device 220 by layer 3 IP address (e.g., so that the access point device 220 can prevent a "local bridge" between associated client devices communicating with each other). Unlike the access point device 102 of FIG. 1, the access point device 220 uses the associated client devices table 304 to prevent a local bridge rather than create one. By preventing a local bridge, the access point device 220 can ensure that the MAC assertion module 300 (as illustrated in FIG. 2 and the exploded view of the access point device 220 in FIG. 3) can perform MAC address modification so that all packets between associated client devices can be transmitted to the security device 202 as will later be described in detail in FIG. 3 (e.g., without MAC address modification, a local bridge would otherwise form).

Figure 3:
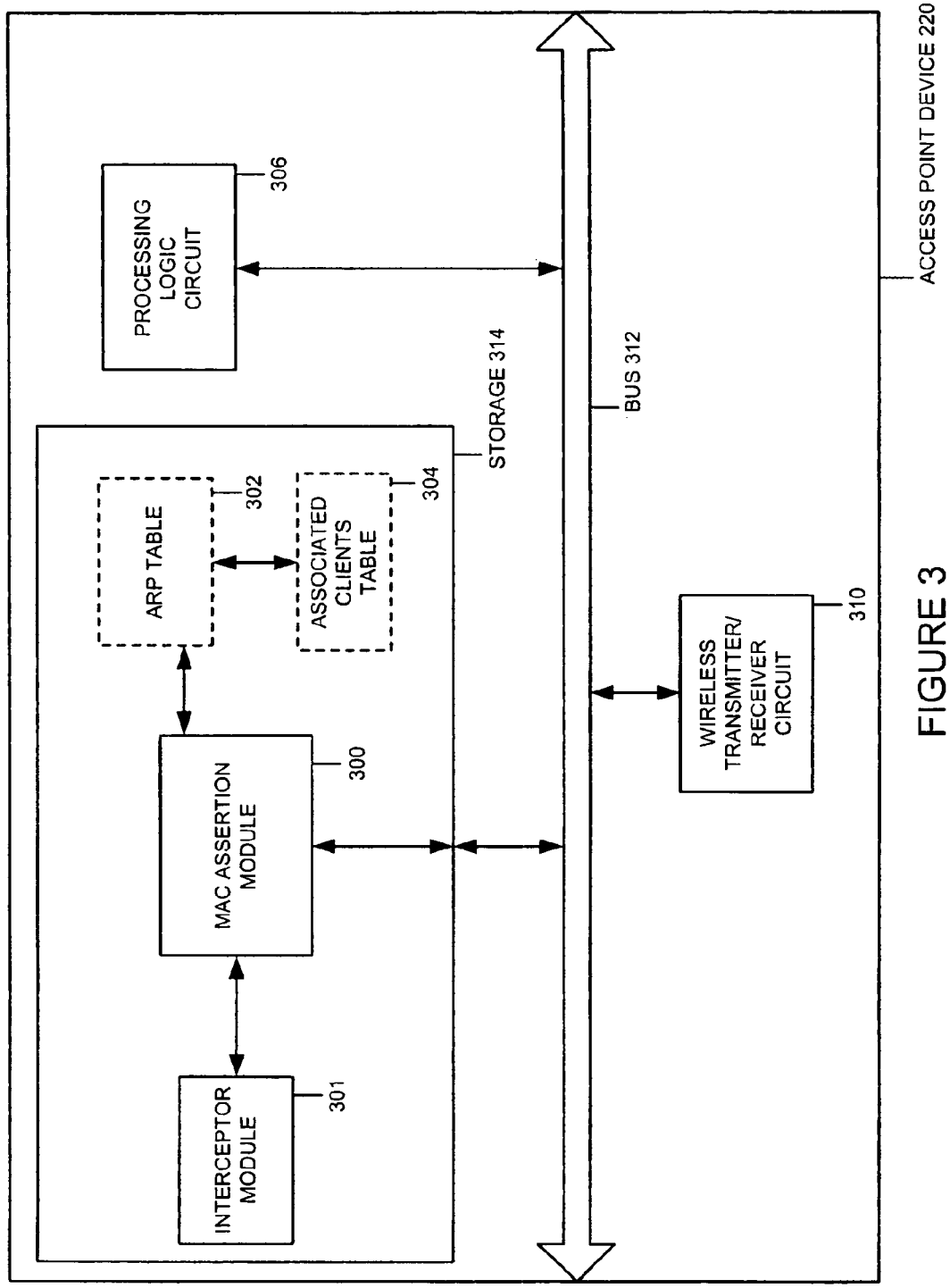
FIG. 3 is an exploded view of the access point device of FIG. 2 having a media access control (MAC) assertion module, according to one embodiment.

Next, the client device 206 may transmit an address resolution protocol (ARP) broadcast message (e.g., a message used to request a client device's layer 2 MAC address from its layer 3 Internet address) to all client devices associated with the LAN 200. The ARP broadcast message may include a destination IP address of the client device 208 and a media access control (MAC) address (e.g., a physical address uniquely identifying the hardware associated with the client device 206) of the client device 206. The access point device 220 may update an ARP table 302 (as shown in FIG. 3) with the MAC address of the client device 206 (e.g., the access point device 220 may store data of the ARP table 302 in an internal cache of FIG. 3), so that it is able to quickly lookup the MAC address of the client device 206 whenever it receives packets having a layer 3 IP address of the client device 206.

When the client device 208 receives the ARP broadcast message sent by the client device 206, it will determine that its IP address matches the requested IP address in the ARP broadcast message, and transmit a unicast ARP response to the client device 206 (e.g., the unicast ARP response intended for one receiver) with a MAC address of the client device 208. According to one embodiment, the access point device 220 will then intercept the unicast ARP response from the client device 208 based upon a match within the associated client devices table 304 using an interceptor module 301 as shown in FIG. 2 and in FIG. 3 (e.g., the access point device 220 may intercept all packets in which the source and destination IP address belong to client devices associated with the access point device 220). The access point device 220 may transmit the intercepted unicast ARP response to the security device 202 by means of MAC address assertion, so that the security device 202 can update the master ARP table 402 (e.g., as shown in the exploded view of the security device 202 in FIG. 4). The access point device 220 may also transmit the unicast ARP response to the client device 206.

Figure 4:
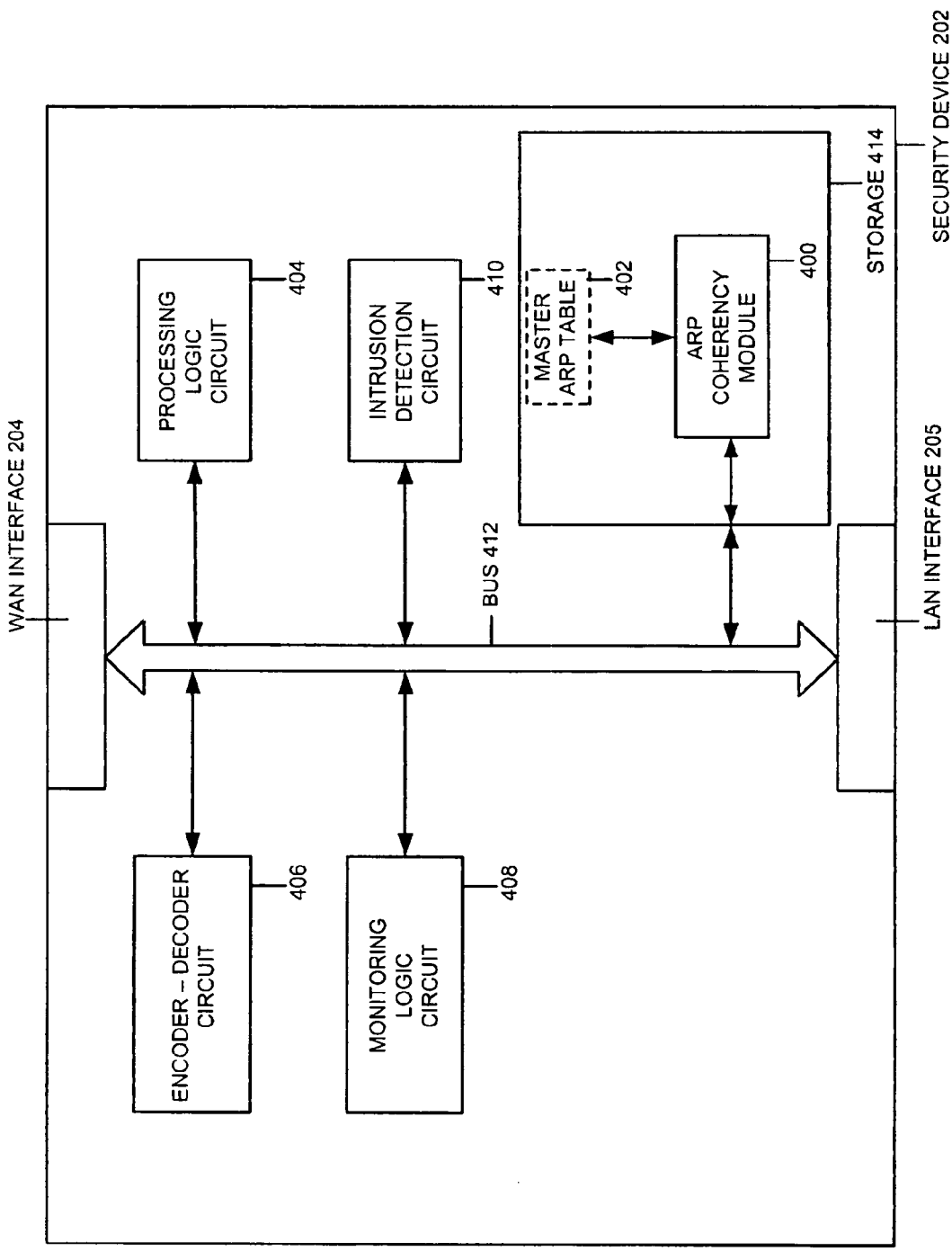
FIG. 4 is an exploded view of the security device of FIG. 2 having an address resolution protocol (ARP) coherency module, a processing logic circuit, a master ARP table, and a variety of other circuits, according to one embodiment.

The security device 202 updates the master ARP table 402 (e.g., as shown in the exploded view of the security device 202 in FIG. 4) with the broadcast ARP message transmitted by the client device 206 using an ARP coherency module 400 (as shown in FIG. 4). The ARP coherency module 400 of the security device 202 ensures that the master ARP table 402 includes the most current mappings between an IP address and a MAC address. The ARP coherency module 400 may also update the master ARP table 402 using information from the intercepted unicast ARP response (e.g. intercepted using the interceptor module 301) transmitted to the security device 202 from the access point device 220. The intercepted unicast ARP response will contain the MAC address of the destination client device 208. By updating the master ARP table 402 with the MAC address of the destination client device 208 using the unicast ARP response, the ARP coherency module 400 is able to return packets to a destination client device based on referencing up a packet's IP address to the master ARP table 402.

Referring back to FIG. 2, the client device 206 may transmit a packet (e.g., or series of packets) having a destination IP address (e.g., a layer 3 destination Internet Protocol address) associated with the client device 208 to the access point device 220. The access point device 220 will use the associated client devices table 304 (as illustrated in FIG. 3), to prevent a local bridge from forming. Upon determining that the packet has a destination address of another client associated with the access point device 220, the access point device 220 will communicate the packet to the MAC assertion module 300 (as illustrated in FIG. 3) of the access point device 220.

The MAC assertion module 300 of the access point device 220 will modify the MAC address of the packet transmitted by an associated client (e.g., the client device 206 in this example) having a destination of another client associated with the access point device 220 (e.g., the client device 208 in this example). The MAC assertion module 300 will modify the MAC address of the packet (e.g., associated with the client device 208) to that of the MAC address of the LAN interface 205 of the security device 202. By modifying the packet's MAC address of the client device 208 to the MAC address of the LAN interface 205 of the security device 202, the packet will be delivered to the security device 202. That way, security functions can be applied by the security device 202. It should be noted that the MAC assertion module 300 will make no changes to the destination IP address of the packet (e.g., the destination IP address of the client device 208) but will merely change the MAC address of the packet. After the MAC assertion module 300 of the access point device 220 performs MAC address modification, the packet may be transmitted to the security device 202.

The security device 202 may perform any number of the security functions described above (e.g., content filtering, intrusion prevention, antivirus scanning, etc.) to the packet transmitted by the client device 206 having the destination IP address of the client device 208 (e.g., a network administrator may determine what security functions are applied to packets communicated through the security device 202). In one embodiment, a processing logic circuit 404 of the security device 202 (as illustrated in FIG. 4) uses an encoder-decoder circuit 406, a monitoring logic circuit 408, an intrusion detection circuit 410, and a storage 414 (e.g., a random access memory, a hard drive, a flash memory, a cache memory, and/or any type of volatile and/or non-volatile memory) to perform various security functions.

Once the security functions are performed, the ARP coherency module 400 (e.g., as illustrated in FIG. 4) may reference the master ARP table 402 (as illustrated in FIG. 4) of the security device 202 to determine the MAC address of the packet. Because only the layer 2 MAC address of the packet is modified by the MAC assertion module 300 of the access point device 220, the packet will still contain the layer 3 destination IP address of the client device 208. Furthermore, the master ARP table 402 will have a mapping between the layer 3 destination IP address of the client device 208 and the layer 2 MAC address of the client device 208 based on the intercepted unicast IP response that was transmitted by the access point device 220 to the security device 202 as described above (e.g., the ARP coherency module 400 may have updated the master ARP table based on the intercepted unicast response by the client device 208 to the ARP broadcast message transmitted by the client device 206). Once the MAC address for the client device 208 is determined (e.g., by referencing the master ARP table 402), the packet may be transmitted from the security device 202 to the client device 208 (e.g., the security device 202 will write the packet to the relevant network interface for delivery (e.g., may include an antenna connected to one or more wireless local area network (WLAN) ports). It will be understood that the MAC address of the packet may need to modified again with the MAC address for the client device 208 so that the packet can return to the desired destination (e.g., the MAC address may be modified by the processing logic circuit 404 of the security device 202).

When the client device 208 transmits a response packet (e.g. or series of response packets) having a destination IP address of the client device 206, the process may operate in reverse (e.g., the access point device 220 may reference the associated client devices table 304 to determine if the source and destination IP addresses belong to associated client devices, the MAC assertion module 300 may modify a MAC address of a packet between associated client devices to the security device 202, the security device 202 may perform security functions on the packet, and the master ARP table 402 may be referenced to transmit the packet to the client device 206 after the security functions are completed).

Referring back to FIG. 2, in another example, the client device 206 associated with the access point device 220 may wish to communicate with a client device 212 associated with the access point device 218. Although the client device 206 and the client device 212 are not associated with the same access point device (e.g., the client device 206 and the client device 208 were associated with the same access point device 220 in the previous example), the client device 206 and the client device 212 are connected to each other through the switch 216 (e.g., a separate physical Ethernet switch or hub).

The switch 216 may also be connected to the client device 210 and the other device(s) 214. The client device 210 may be a standalone client device, such as a wired computer or terminal, which communicates with the LAN 200 using physical wired connections. The other device(s) 214 may include networked printers, scanners, digital cameras, copiers, and/or other input/output devices.

The switch 216 may create a local bridge for all communications between the client device 206 and the client device 212 without MAC address modification by the MAC assertion modules (e.g., the MAC assertion module 300 of FIG. 3) of the access point device 220 and/or the access point device 218 when the client device 206 and/or the client device 212 communicate with each other. The switch 216 may also form a local bridge between communications of the client device 210, the other device(s) 214, and any of the client devices associated with the access point device 220 and/or the access point device 218 if MAC address modification is not performed by the MAC assertion modules (e.g., the MAC assertion module 300 of FIG. 3) of the access point device 220 and/or the access point device 218 when the client devices communicate with each other. If a local bridge is created by the switch 216 for communications between the client device 206 and the client device 212, the security functions of the security device 202 will not be applied, because a packet will never reach the security device 202.

Therefore, the access point devices performs MAC address translation when packets are communicated between client devices associated through the same shared access point device, even when the shared device is the switch 216 rather than an access point device (e.g., otherwise the "local bridge" will form and packets will not reach the security device 202). When the client device 206 wishes to communicate with the client device 210, the access point device 220 may use the MAC assertion module 300 to modify the destination MAC address of the client device 210 to be the LAN interface 205 of the security device 202.

The access point device 220 may know that the client device 206 and the client device 210 are associated with each other through the switch 216 because the access point device 220 may update the associated client devices table 304 with client devices associated with the access point device 220 either through authentication (as described in the previous examples on FIGS. 1-3), and/or associated through the switch 216 (e.g., the switch 216 may inform the access point device 220 of clients associated directly with the switch 216, and/or the access point device 220 may send a periodic query to all client devices connected to the switch to update the associated devices table 304, and/or through heartbeat messaging, and/or through any messaging technique known in the art).

When the access point device 220 determines that communications are being requested between one of its associated client devices, and/or between a client device connected through the switch 216, it will modify the MAC address of a packet to the MAC address of the security device 202. In addition, the security device 202 updates the master ARP table 402 using the ARP coherency module 400 for ARP broadcast messages and ARP responses transmitted by any client device associated with the LAN 200. The security device 202 may perform any number of the security functions as previously described to data between clients connected through the switch 216. Once the security functions are preformed, the security device 202 may reference the master ARP table 402 as described previously and transmit the packet to its destination.

Referring again to FIG. 3, also illustrated in FIG. 3 is a hardware architecture (e.g., system view) of the access point device 220 that allow the MAC assertion module 300 to operate, according to one embodiment. Specifically, in FIG. 3, a bus 312 connects a processing logic circuit 306 (e.g., a microprocessor), a wireless transmitter/receiver circuit 310 (e.g., to transmit and receive wireless communications to/from various clients), and a storage 314 (e.g., a random access memory, a cache memory, a flash memory, a hard drive, any other non-volatile and/or volatile storage). The interceptor module 301, the MAC assertion module 300, the ARP table 302, and the associated clients table 304 may be stored within the storage 314 as illustrated in FIG. 3. In another embodiment, the interceptor module 301, the MAC assertion module 300, the ARP table 302, and the associated clients table 304 may be created in hardware (e.g., CMOS based logic circuitry) and/or in a separate cache memory (e.g., and/or other high-speed memory) directly connected to the bus 312.

FIG. 4 illustrates a hardware architecture (e.g., system view) of the security device 202 that allows the ARP coherency module 400 to operate, according to one embodiment. Specifically, in FIG. 4, a bus 412 connects the ARP coherency module 400 to a processing logic circuit 404 (e.g., logic code within a microprocessor), an encoder-decoder circuit 406 (e.g., to perform firewall functions), a monitoring logic circuit 408 (e.g., to perform virus checking functions), and an intrusion detection circuit 410 (e.g., to detect for parasitic intrusions to the network). The master ARP table 402 and the ARP coherency module 400 may be formed within the storage 414 as illustrated in FIG. 4. In another embodiment, the master ARP table 402 and the ARP coherency module 400 may be created in a hardware circuitry (e.g., CMOS based logic circuitry) and/or separate cache memory (e.g., and/or other high-speed memory) directly connected to the bus 412.

Figure 5:
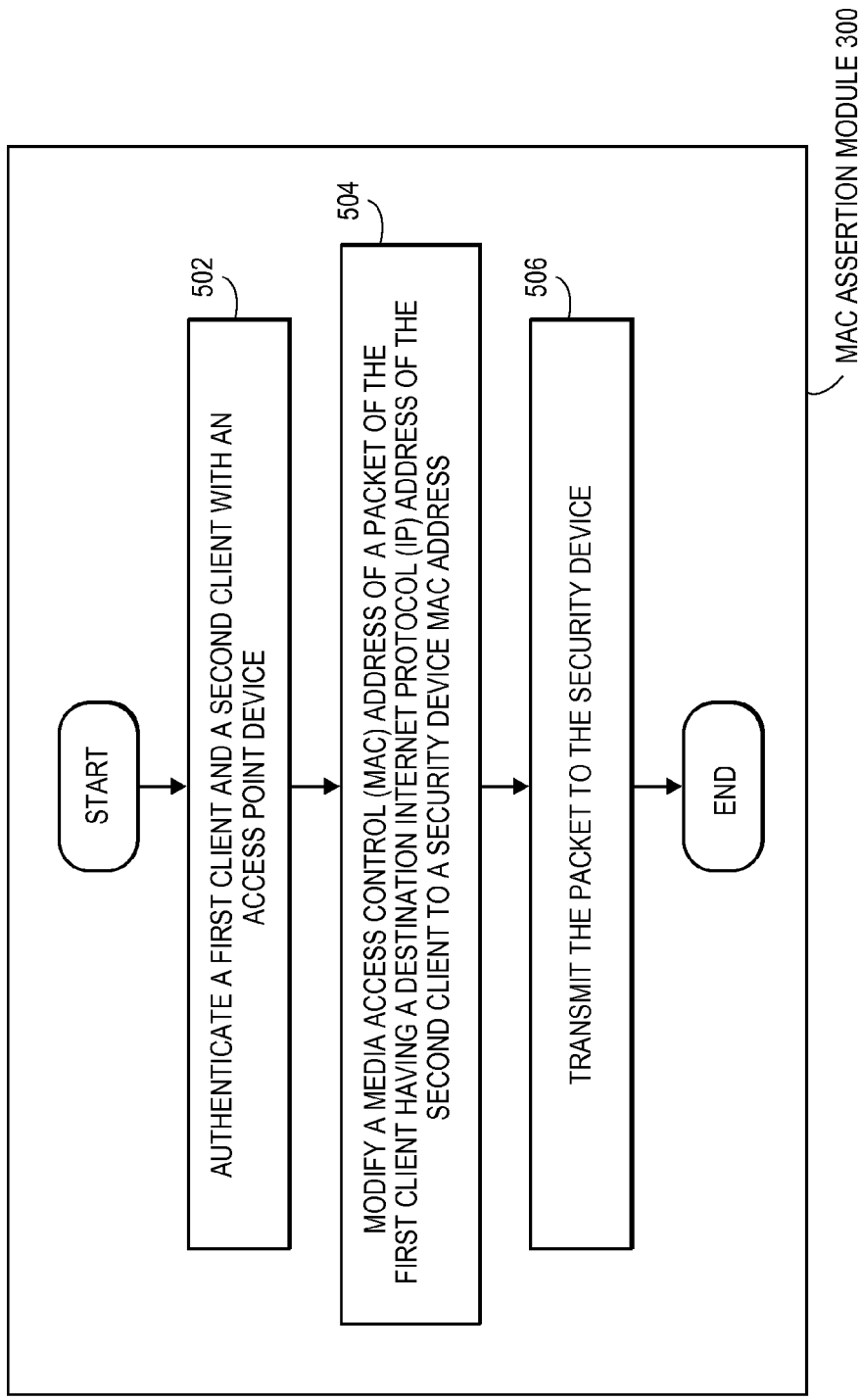
FIG. 5 is a process flow diagram of the MAC assertion module of FIG. 3 when client devices associated with the same access point device communicate with each other, according to one embodiment.

FIG. 5 is a process flow diagram of the MAC assertion module 300 of FIG. 3 when client devices associated with the same access point device (e.g., with optional authentication) communicate with each other, according to one embodiment. In operation 502, a first client (e.g. the client device 206) and a second client (e.g., the client device 208) are optionally authenticated with an access point device (e.g., the access point device 220 using a method of authentication such as 802.1x, WiFi Protected Access [WPM] or some other form of user or certificate level authentication). In operation 504, a media access control (MAC) address of a packet of the first client (e.g., the client device 206) having a destination internet protocol (IP) address of the second client (e.g., the client device 208) is modified to a security device MAC address (e.g., the MAC address of the LAN interface 205 of the security device 202). In operation 506, the packet is transmitted to the security device (e.g., the security device 202). In one embodiment, the various circuits shown in FIG. 4 may be implemented in software code, hardware, and/or a combination.

Figure 6:
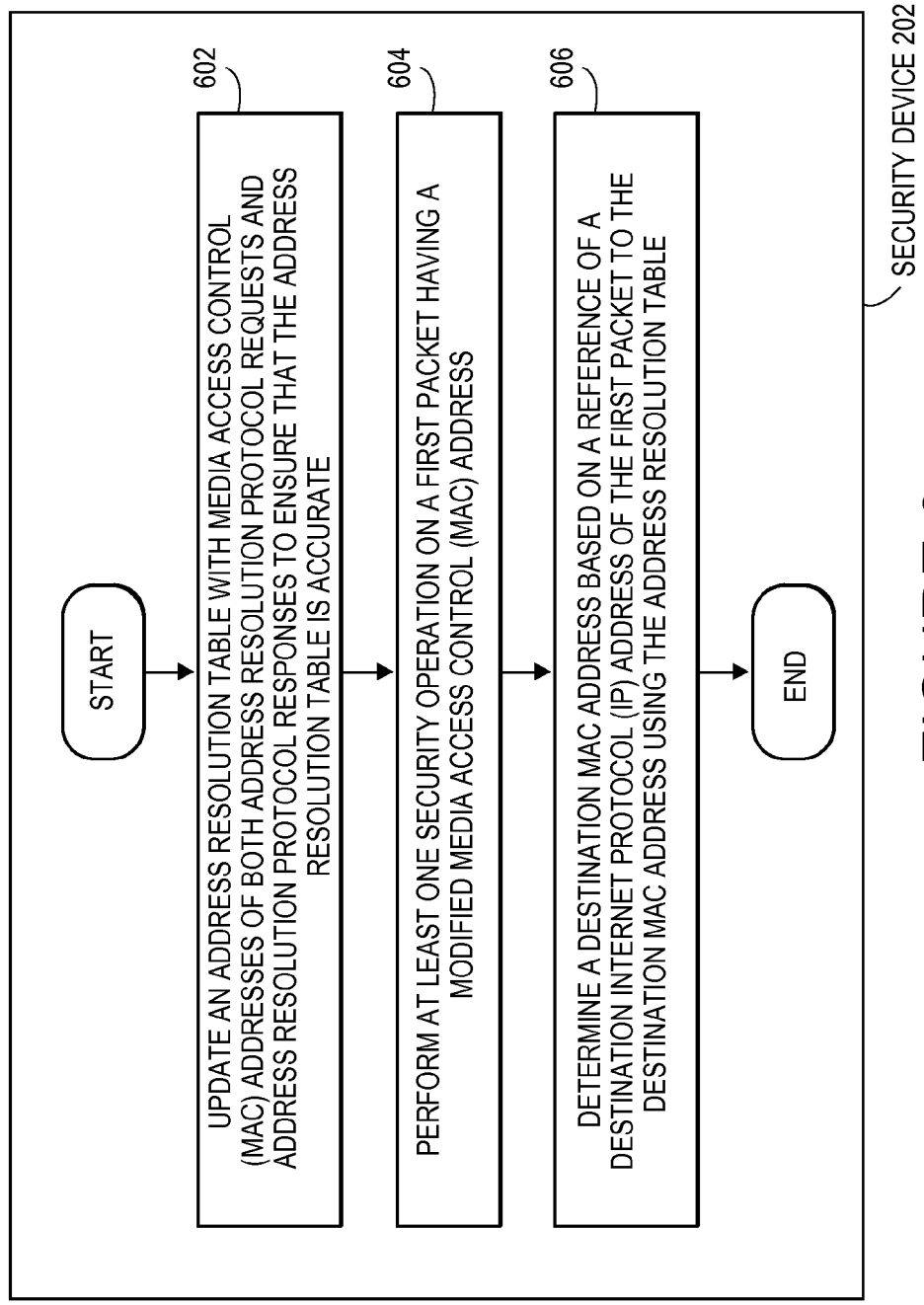
FIG. 6 is a process flow diagram of the ARP coherency module and the processing logic circuit of the security device of FIG. 4, according to one embodiment.

FIG. 6 is a process flow diagram of the ARP coherency module 400 and the processing logic circuit 404 of the security device 202 of FIG. 4, according to one embodiment. In operation 602, an address resolution table (e.g., the master ARP table 402) is updated with MAC addresses of both address resolution protocol requests (e.g., transmitted by the client device 206) and address resolution protocol responses (e.g., transmitted by the client device 208) to ensure that the address resolution table (e.g., the master ARP table 402) is accurate. In operation 604, at least one security operation (e.g., the deep packet inspection operation, the firewall policy operation, and the content filtering operation, etc.) is performed on a first packet having a modified media access control (MAC) address (e.g., the packet transmitted by the client device 206). In operation 606, a destination MAC address (e.g., of the client device 208) is determined based on a reference of a destination internet protocol (IP) address of the first packet to the destination MAC address using the address resolution table (e.g., the master ARP table 402).

Figure 7:
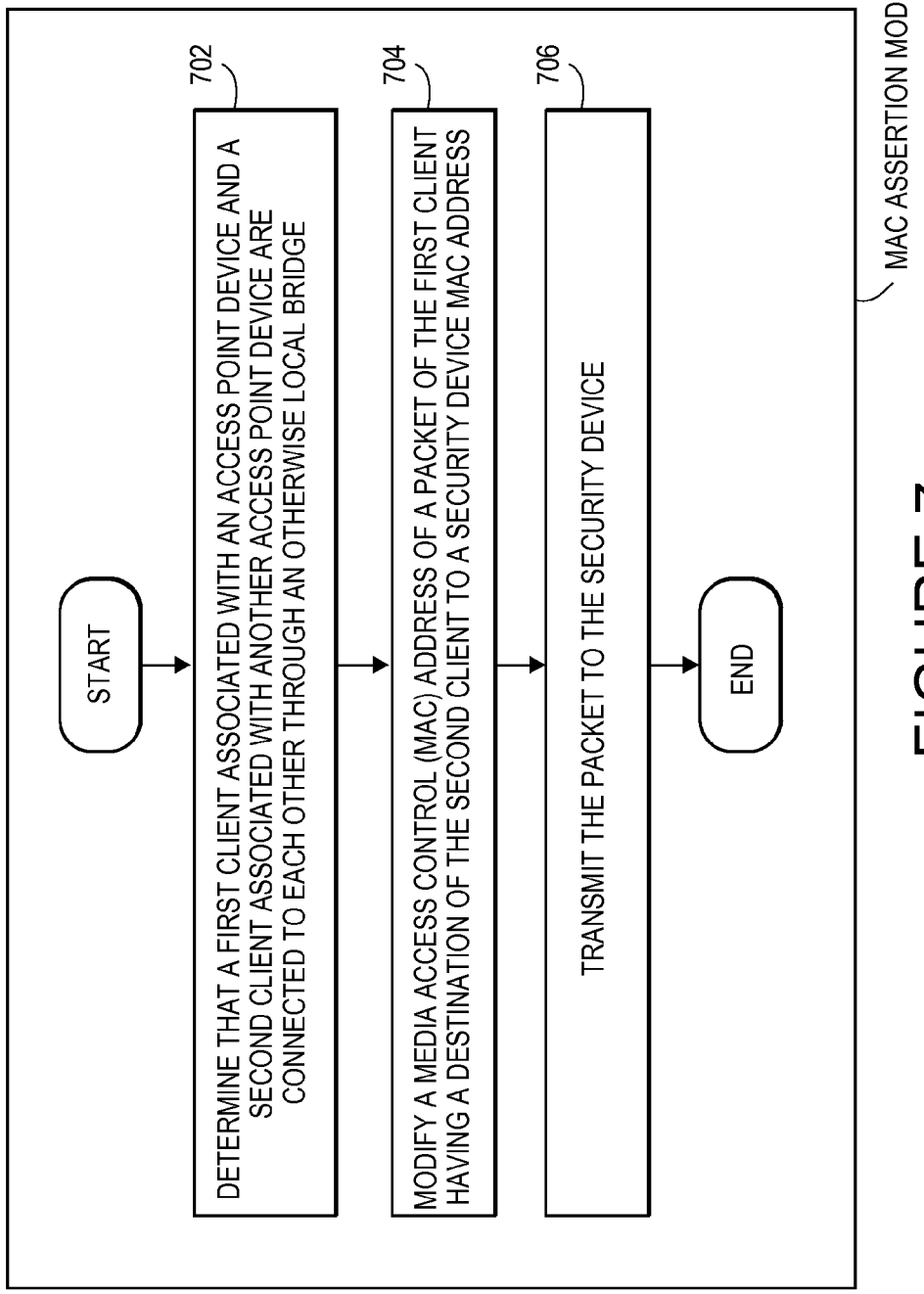
FIG. 7 is a process flow diagram of the MAC assertion module of FIG. 3 when client devices associated with different access point devices connected together by an otherwise local bridge communicate with each other, according to one embodiment.

FIG. 7 is a process flow diagram of the MAC assertion module 300 of FIG. 3 when client devices associated with different access point devices connected together by an otherwise local bridge communicate with each other, according to one embodiment. In operation 702, a determination is made that a first client (e.g., the client device 206) associated with an access point device (e.g., the access point device 220) and a second client (e.g., the client device 212) associated with another access point device (e.g., the access point device 218) are connected to each other through an otherwise local bridge (e.g., that would be formed through the switch 216 without MAC address modification). The determination may involve processing a data from the first client (e.g., the client device 206) connected to a shared device (e.g., the shared device may be the access point device 218 and/or the access point device 220 and/or the switch 216).

In operation 704, a media access control (MAC) address of a packet of the first client (e.g., the client device 206) having a destination of the second client (e.g., the client device 208) is modified to a security device MAC address (e.g., the MAC address of the LAN interface 205 of the security device 204). In operation 706, the packet is transmitted to the security device 202. Data may be sent through the security device (e.g., the security device 202) when the data includes information indicating that the data has a destination of another client (e.g., the client 212) connected through an otherwise local bridge (e.g., the local bridge formed between the client device 206 and the client device 212 by the access point device 218 and/or the access point device 220 and/or the switch 216).

Figure 8:
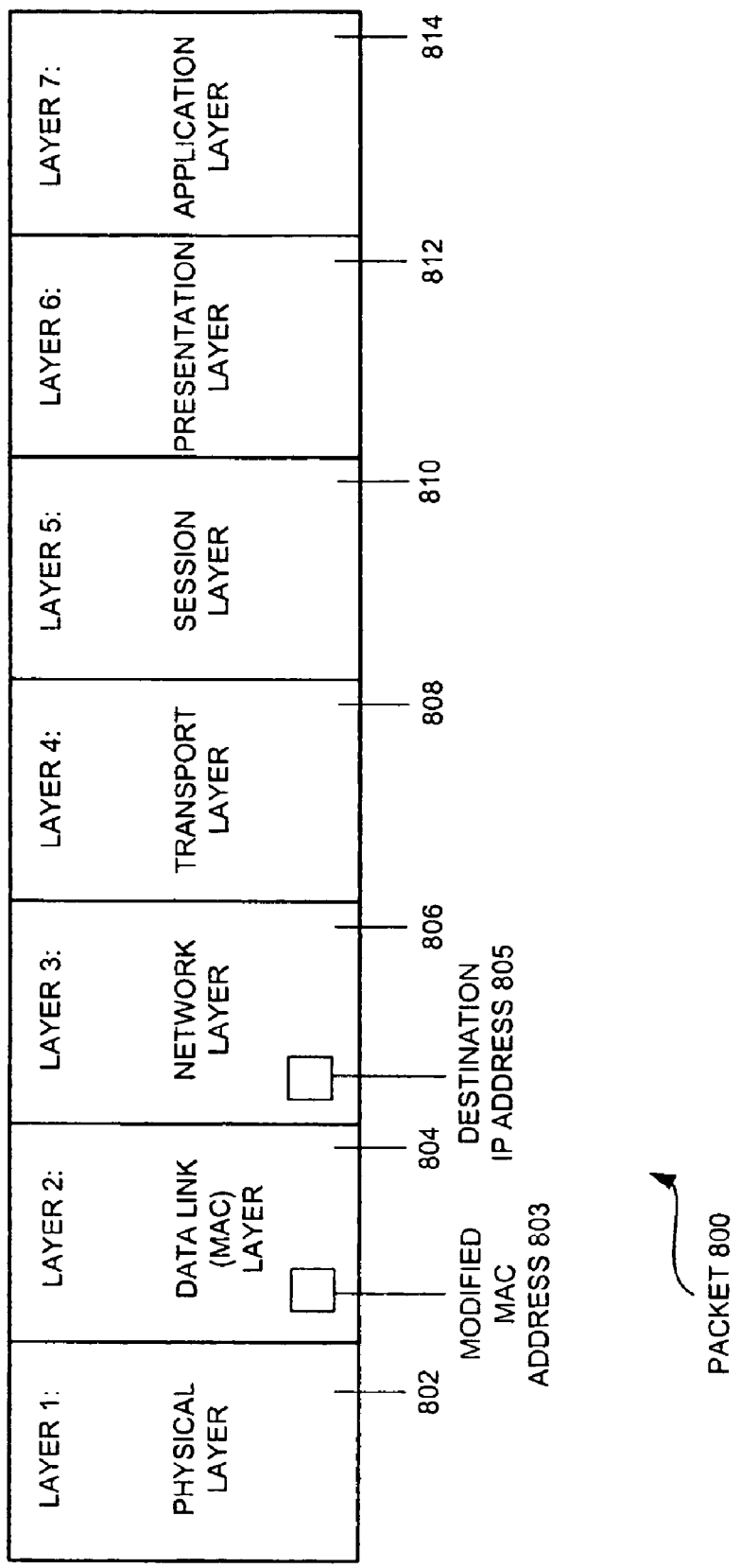
FIG. 8 is a block diagram of a packet generated by a client device having a modified MAC address and a destination IP address, according to one embodiment.

FIG. 8 is an exemplary block diagram of a packet 800 generated by a client device (e.g., the client device 206), according to one embodiment. The packet 800 includes seven layers of the OSI stack, including a physical layer 802 (layer 1), a data link (MAC) layer 804 (layer 2), a network layer 806 (layer 3), a transport layer 808 (layer 4), a session layer 810 (layer 5), a presentation layer 812 (layer 6), and an application layer 814 (layer 7). In one embodiment, the packet 800 may not include the session layer 810 and the presentation layer 812 (e.g., a TCP/IP implementation of the OSI stack). The layer 2 data link (MAC) layer 804 may include the modified MAC address 803 (e.g., as modified by the MAC assertion module 300 of FIG. 3 to point to the security device 202). The layer 3 network layer 806 may include a destination IP address 805 (e.g., that remains unmodified by the MAC assertion module 300 of FIG. 3).

Figure 9:
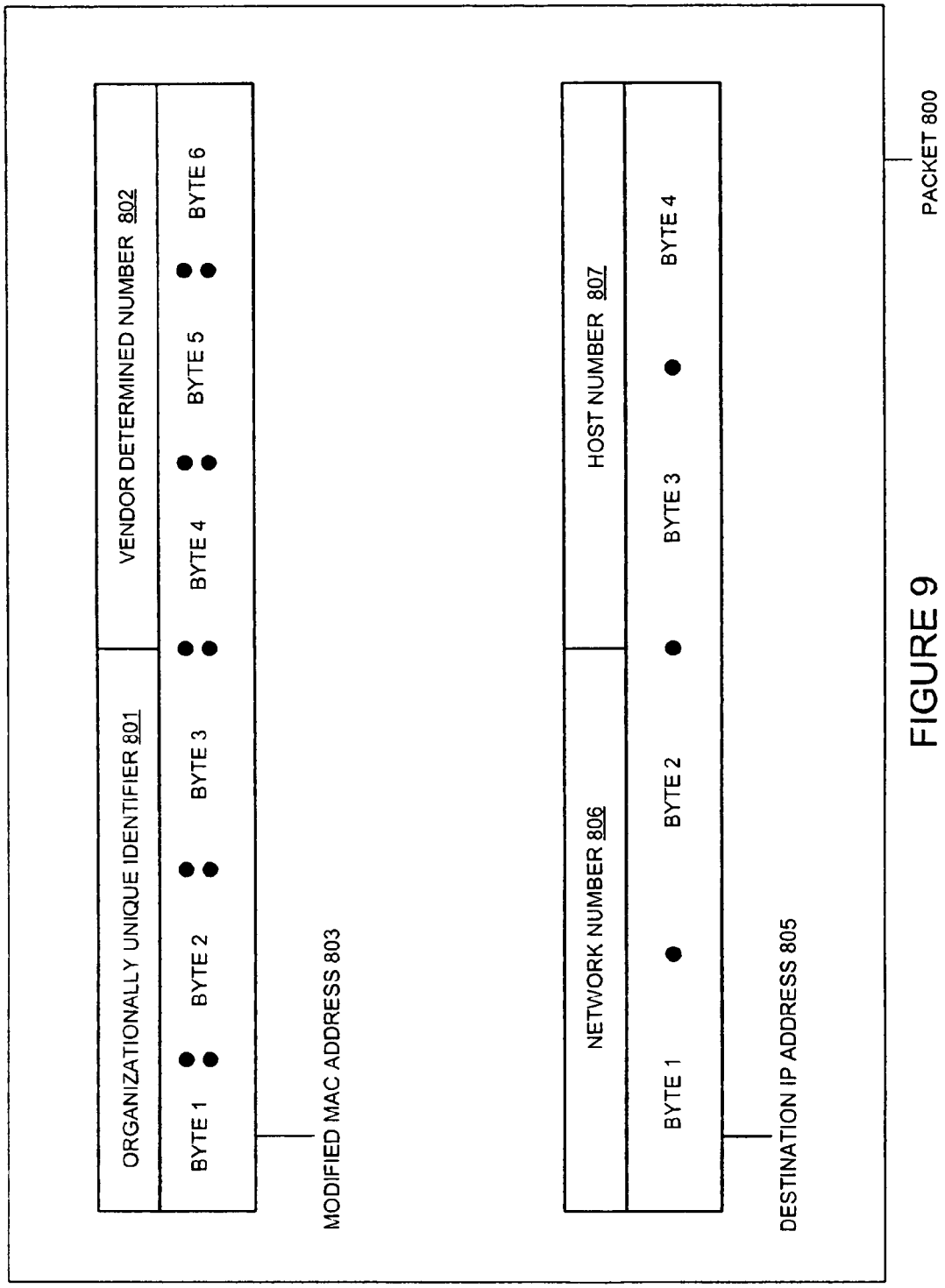
FIG. 9 is a data block view of the modified MAC address and the destination IP address of FIG. 8, according to one embodiment.

FIG. 9 is a data block view of the modified MAC address 803 and the destination IP address 805 of the packet 800 of FIG. 8. The modified MAC address 803 illustrated in FIG. 9 is six bytes in length (each byte separated by a colon) includes an organizationally unique identifier 801 and a vendor determined number 802. The modified MAC address 803 should not be confused with a physical MAC address. The physical MAC address may be burned into read only memory (ROM) of a hardware device and/or interface and is copied into RAM when the device or interface card initializes. The modified MAC address 803 is a logical pointer generated by a client device (within a layer 2 data link layer 804 of a packet as illustrated in FIG. 8) to reference the physical MAC address (e.g., of the security device 202).

The organizationally unique identifier 801 of the modified MAC address 803 may be three bytes in length (expressed as 6 hexadecimal digits) and is assigned by a standards body (e.g., IEEE internet standards body) to every manufacturer of an individual network device/interface (e.g., an adapter, a controller, an interface port, a network card, or an entire device). The vendor determined number 802 may be three bytes in length as well (expressed as 6 hexadecimal digits) and may be determined by any manufacturer of a hardware device (e.g., must be unique to the particular network device and/or interface).

FIG. 9 also illustrates a destination IP address 805 having four bytes of data (e.g., each byte separated by a dot). The destination IP address 805 is unmodified by the MAC assertion module 300 of the access point device 220 as illustrated in FIG. 3. As described previously, by not modifying the destination IP address (e.g., the destination IP address 805), a packet may be returned to the destination intended by a sender after any number of security functions are performed by the security device 202 (e.g., by referencing the master ARP table 402 within the security device 202 as described previously).

The destination IP address 805 in FIG. 9 includes a network number 806 and a host number 807. The network number 806 identifies which particular network (e.g., which LAN 200 connected to the network 100 as shown in FIG. 2) a particular device belongs to. The host number 807 identifies a particular host device on a particular network is associated with the device. The host number 807 is a logical descriptor of a particular host device, rather than a physical descriptor of a particular host device (e.g., the physical MAC address). The destination IP address 805 is translated into a destination MAC address using the master ARP table 402 (as shown in FIG. 4) of the security device 202 so that packets received having modified MAC addresses (e.g., the modified MAC address 803) can be returned to the desired destination after any number of security functions are performed.

Figure 10:
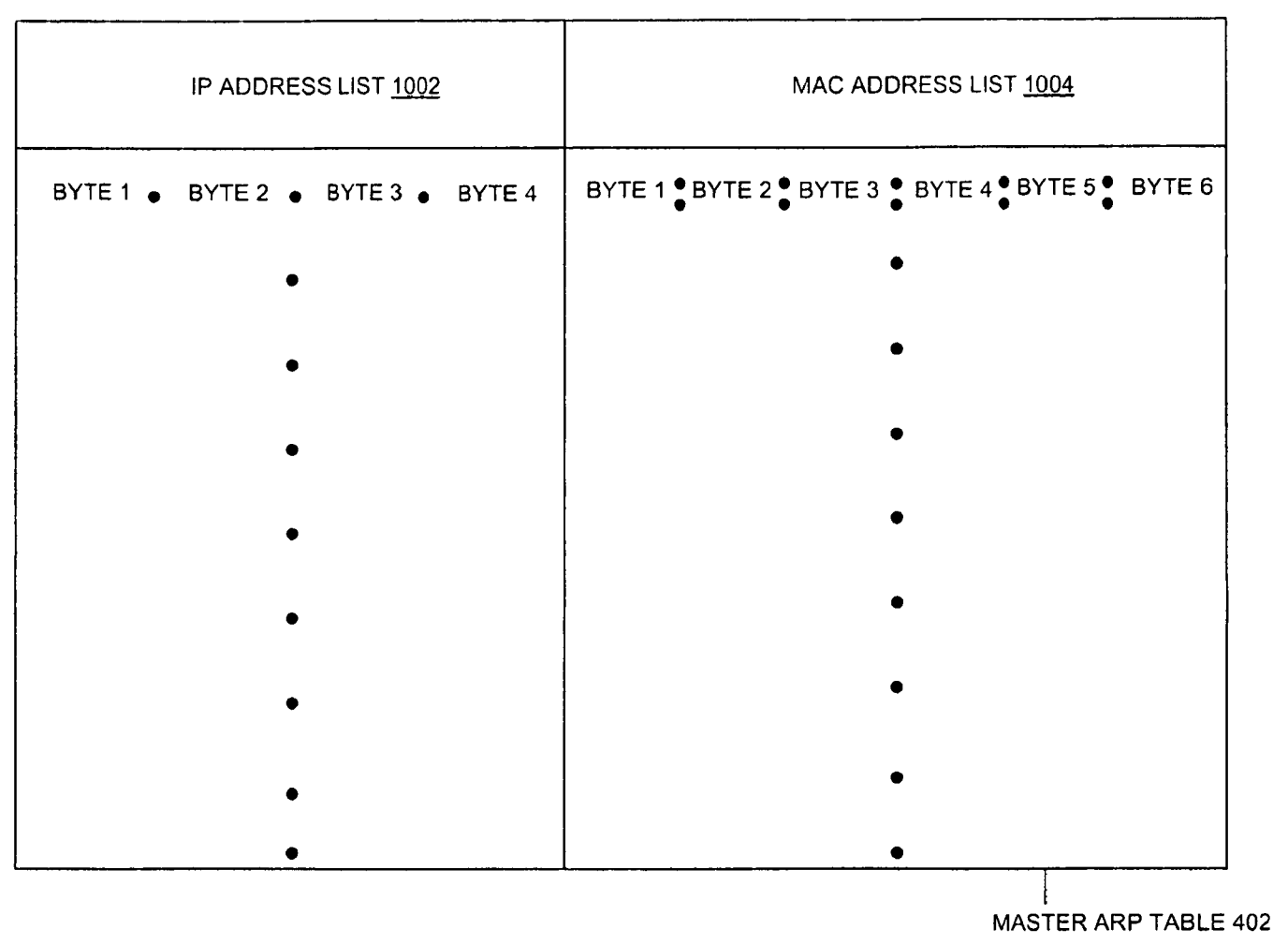

FIG. 10 is a table view of the master ARP table 402 of FIG. 4, according to one embodiment. The master ARP table 402 includes an IP address list 1002 and a MAC address list 1004. The IP address list 1002 may reference a particular layer 3 IP address for a destination client device, and the MAC address may reference a layer 2 MAC address for the destination client device. As described previously, the master ARP table 402 is updated for both ARP broadcast messages, and for unicast ARP responses forwarded by an access point device to the security device 202.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "authenticating" or "modifying" or "determining" or "updating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various embodiments also relate to an apparatus for performing the operations described herein. The apparatus may be specially constructed for the required purposes, or it may comprise a general purpose computer selectively activated or reconfigured by a computer program stored on the computer on a machine-accessible medium. The machine-accessible medium may include any mechanism for storing or transmitting information in a form readable by a machine (e.g., a computer) including a machine-readable medium. The machine-readable medium includes read only memory ("ROM"); random access memory ("RAM"); magnetic disk storage media; optical storage media; or flash memory devices; electrical, optical, acoustical; etc.

This apparatus may be specially constructed for the required purposes, or it may comprise a general-purpose computer selectively activated or reconfigured by a computer program stored in the computer. Such a computer program may be stored in a computer readable medium.

The processes and operations presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description above. In addition, various embodiments are not described with reference to any particular programming language. It will be appreciated that a variety of programming languages may be used to implement the teachings as described herein.

It should be noted that the various embodiments having modules, circuits, switches, devices, tables, processors, and electronics described herein may be performed within hardware circuitry (e.g., logic circuitry such as CMOS based circuitry) as well as in software (e.g., through machine-implemented methods and/or through machine-readable mediums). Specifically, it should be noted that an architecture for the access point device 218, the access point device 220, and the security device 202 of FIGS. 1-10 can be implemented in some embodiments with software (e.g., programming code generated in machine language, C++, and/or any other type of programming language and accessible through a machine readable medium).

Furthermore, it should be noted that the architecture may be implemented with one or more semiconductor devices including circuitry such as logic circuitry to perform its various functions as described above. In some embodiments, hardware circuitry may provide speed and performance advantages over software implementations of the MAC assertion module 300 and/or the ARP coherency module 400 of FIG. 3 and FIG. 4. In other embodiments, software implementations may be preferred. In one embodiment, the MAC assertion module 300 and/or the ARP coherency module 400 may be designed using a MAC assertion circuit, a ARP coherency circuit, and/or any combination of these circuits, and may be built with semiconductor circuitry (e.g., logic circuitry such as CMOS based circuitry). A semiconductor chip may implement the functions (e.g., as described in FIG. 1 thru FIG. 10) described within the various embodiments using logic gates, transistors, and hardware logic circuitry associated with implementing the various embodiments disclosed herein.

In the foregoing specification, the embodiments have been described with reference to specific exemplary embodiments thereof. It will be evident that various modifications may be made thereto without departing from the broader spirit and scope of the embodiments as set forth in the following claims. For example, in some embodiments, the concepts disclosed herein may be applied to other networking standards and protocols consistent with this disclosure which are similar to, but not explicitly confined to the media access control (MAC) addresses and interne protocols (IP) explicitly disclosed herein. The specification and drawings are, accordingly, to be regarded in an illustrative sense rather than a restrictive sense.

What is claimed is:

1. A method for providing security to a client-to-client communication, the method comprising:
   authenticating a first client and a second client with an access point device, wherein the first and second clients are locally bridged via the access point device within a local area network (LAN);
   in response to a packet received from the first client, the packet having a destination internet protocol (IP) address of the second client, the access point device modifying a destination media access control (MAC) address of the packet to a MAC address of a security device associated with the LAN, wherein the security device is a gateway device interfacing the LAN and a wide area network (WAN);
   transmitting the packet with the modified destination MAC address to the security device, wherein the security device performs content filtering on the payload of the packet to determine whether the packet is eligible to reach the second client locally bridged to the first client within the LAN;
   in response to a result of the content filtering performed on the packet, if the packet is eligible to reach the second client, the security device determining the destination MAC address of the second client based on the destination IP address of the packet;

the security device modifying the packet by replacing the destination MAC address of the packet with the determined destination MAC address of the second client; and the security device transmitting the modified packet to the second client over the LAN based on the destination MAC address of the second client.

2. The method of claim 1, wherein the security device performs content filtering on packets exchanged between the first client or the second client with a remote facility of the WAN.

3. The method of claim 2, wherein the security device further performs at least one of a deep packet inspection operation and a firewall policy operation on the packet.

4. The method of claim 2, wherein the security device includes an address resolution table that corresponds a MAC address to an internet protocol (IP) address, wherein the destination MAC address of the second client is determined by the security device by looking up the address resolution table based on the destination IP address of the packet.

5. The method of claim 4, wherein the address resolution table is updated based on an address resolution protocol request and an address resolution protocol response.

6. The method of claim 1, wherein the modifying is performed when the first client is connected to the second client through an external switch between the access point device and the security device.

7. A method for providing security to a client-to-client communication, the method comprising:
 a processing logic circuit performing content filtering on a payload of a packet having a modified destination media access control (MAC) address to block inappropriate content, wherein the packet is originated from a first client via an access point device that has modified an original destination MAC address of a second client in the packet to the modified destination MAC address, wherein the first client and the second client are locally bridged via the access point device within a local area network (LAN), and wherein the content filtering is performed to determine whether the packet is eligible to reach the second client locally bridged to the first client within the LAN;
 if a result of the content filtering on the packet is satisfied, an address resolution protocol (ARP) coherency module, which runs on the processing logic circuit, changing the modified destination MAC address in the packet to the original destination MAC address of the second client based on a destination internet protocol (IP) address of the packet, wherein the access point device and the first and second clients belong to a local area network (LAN); and
 a network interface transmitting the packet modified to the second client based on the original destination MAC address of the second client.

8. The method of claim 7, wherein the changing is made using an address resolution table.

9. The method of claim 8, further comprising the processing logic circuit updating the address resolution table with media access control (MAC) addresses of both address resolution protocol requests and address resolution protocol responses to ensure that the address resolution table is accurate.

10. The method of claim 7, wherein the access point device includes any one of an access point device, and a switch.

11. The method of claim 10, wherein the any one of the access point device, and the switch does not perform any security operations on the packet.

12. The method of claim 10, further comprising the processing logic circuit performing at least one of a deep packet inspection operation and a firewall policy operation on the packet.

13. An access point device, comprising:
 a processing logic circuit;
 a random access memory and at least one storage device connected to the processing logic circuit; and
 a media access control (MAC) assertion module, connected to the processing logic circuit, in response to a packet, received from a first client, having a destination internet protocol (IP) address of a second client, to modify a destination media access control (MAC) address of the packet to a MAC address of a security device associated with a local area network (LAN), wherein the security device is a gateway device interfacing the LAN and a wide area network (WAN), and wherein the first client and the second client are locally bridged via the access point device within the LAN, and to transmit the packet with the modified destination MAC address to the security device, wherein the security device performs content filtering on a payload of the packet to determine whether the packet is eligible to reach the second client locally bridged to the first client within the LAN, wherein, in response to a result of the content filtering on that packet, if the payload of the packet does not contain inappropriate content, the security device determines the destination MAC address of the second client based on the destination IP address of the packet, modifies the packet by replacing the destination MAC address of the packet with the determined destination MAC address of the second client, and transmits the modified packet to the second client over the LAN based on the destination MAC address of the second client.

14. The access point device of claim 13, wherein the security device further performs at least one of a deep packet inspection operation and a firewall policy operation on the packet.

15. The access point device of claim 14, wherein the security device uses an address resolution table.

16. The access point device of claim 15, wherein the address resolution table is updated with MAC addresses of both address resolution protocol requests and address resolution protocol responses to ensure that the address resolution table is accurate.

17. The access point device of claim 13, wherein the second client is authenticated with a different access point device than the access point device.

18. A security device, comprising:
 a processing logic circuit to perform content filtering on a payload of a packet having a modified destination media access control (MAC) address to determine whether the packet is eligible to reach a second client locally bridged to a first client within a local area network (LAN), and if a result of the content filtering on that packet is satisfied, change the modified destination MAC address in the packet to the original destination MAC address of the second client based on an address resolution table, wherein the packet is originated from a first client via an access point device that has modified an original destination MAC address of the second client in the packet to the modified destination MAC address, and wherein the first client and the second client are locally bridged via the access point device within the LAN;
 an address resolution coherency module, connected to the processing logic circuit through a bus, wherein to update the address resolution table with MAC addresses of both address resolution protocol requests and address resolution protocol responses; and an interface module, connected to the processing logic module, to transmit the packet modified with the original destination MAC address of the second client.

19. The security device of claim 18, wherein the processing logic circuit further performs at least one of a deep packet inspection operation and a firewall policy operation on the packet having a modified media access control (MAC) address.

20. The security device of claim 18, wherein the address resolution protocol requests are generated by the first client, and the address resolution protocol responses are generated by the second client.

21. A system for managing inter-client communication in a local area network, the system comprising:

a security device associated with the local area network, wherein the security device is located between the local area network and a wide area network; and an access point device, coupled with the security device, to modify a destination media access control (MAC) address of a packet from a first client of the access point device to a MAC address of the security device, wherein the packet contains a destination internet protocol (IP) address of a second client, and wherein the first client and the second client are locally bridged via the access point device within the local area network, wherein, in response to a result of a content filtering operation on a payload of that packet, wherein said content filtering operation is for determining whether the packet is eligible to reach the second client locally bridged to the first client within the local area network, if the payload of the packet does not contain inappropriate content, the security device determines the destination MAC address of the second client based on the destination IP address of the packet, modifies the packet by replacing the destination MAC address of the packet with the determined destination MAC address of the second client, and transmits the modified packet to the second client over the LAN based on the destination MAC address of the second client.

22. The system of claim 21, wherein the second client is associated through a switch in the local area network through another access point device in the local area network.

23. The system of claim 22, wherein the security device updates an address resolution table with media access control (MAC) addresses of both address resolution protocol requests and address resolution protocol responses.

24. The system of claim 23, wherein the first client is a wireless device, and the second client is a wired device.

25. The system of claim 23, wherein the security device further performs at least one of a deep packet inspection operation and a firewall policy operation.

26. A non-transitory computer readable storage medium that provides instructions that, if executed by a processor, will cause the processor to perform a method for providing security to a client-to-client communication, the method comprising:

authenticating a first client and a second client with an access point device, wherein the first client and the second client are locally bridged via the access point device within a local area network (LAN);

in response to a packet received from the first client, the packet having a destination interne protocol (IP) address of the second client, the access point device modifying a destination media access control (MAC) address of the packet to a MAC address of a security device associated with the LAN, wherein the security device is a gateway device interfacing the LAN and a wide area network (WAN); and transmitting the packet with the modified destination MAC address to the security device, wherein the security device performs a content filtering operation on a payload of the packet to determine whether the packet is eligible to reach the second client locally bridged to the first client within the LAN, wherein, in response to a result of the content filtering operation on that packet, if the payload of the packet does not contain inappropriate content, the security device determines the destination MAC address of the second client based on the destination IP address of the packet, modifies the packet by replacing the destination MAC address of the packet with the determined destination MAC address of the second client, and transmits the modified packet to the second client over the LAN based on the destination MAC address of the second client.

27. A non-transitory computer readable storage medium that provides instructions that, if executed by a processor, will cause the processor to perform a method for providing security to a client-to-client communication, the method comprising:

performing a content filtering operation on a payload of a packet having a modified destination media access control (MAC) address to determine whether the packet is eligible to reach a second client locally bridged to a first client within a local area network (LAN), wherein the packet is originated from the first client via the access point device that has modified an original destination MAC address of the second client in the packet to the modified destination MAC address;

if a result of the content filtering operation on that packet is satisfied, changing the modified destination MAC address in the packet to the original destination MAC address of the second client based on a destination internet protocol (IP) address of the packet, wherein the first client and the second client are locally bridged via the access point device within a local area network (LAN);

transmitting the packet modified to the second client based on the original destination MAC address of the second client.

* * * * *